United States Patent
He et al.

(10) Patent No.: US 11,131,804 B1
(45) Date of Patent: Sep. 28, 2021

(54) DEMULTIPLEXER/MULTIPLEXER MODULE USING SUBMODULES HAVING WAVELENGTH-DIVISION-MULTIPLEXING FILTER

(71) Applicant: XDK Communication Equipment (Huizhou) Co. Ltd., Huizhou (CN)

(72) Inventors: Chun He, Fremont, CA (US); Yimou Ling, Shenzhen (CN)

(73) Assignee: XDK Communication Equipment (Huizhou) Ltd., Huizhou (CN)

( * ) Notice: Subject to any disclaimer, the term of this patent is extended or adjusted under 35 U.S.C. 154(b) by 0 days.

(21) Appl. No.: 16/873,679

(22) Filed: May 30, 2020

(51) Int. Cl.
| | |
|---|---|
| H04J 14/02 | (2006.01) |
| G02B 6/12 | (2006.01) |
| G02B 6/293 | (2006.01) |
| F21V 8/00 | (2006.01) |
| H04B 14/02 | (2006.01) |
| H04J 14/00 | (2006.01) |

(52) U.S. Cl.
CPC ......... *G02B 6/12007* (2013.01); *G02B 6/002* (2013.01); *G02B 6/29383* (2013.01); *H04B 14/02* (2013.01); *H04J 14/002* (2013.01); *H04J 14/02* (2013.01); *H04J 14/0202* (2013.01); *H04J 14/0215* (2013.01)

(58) Field of Classification Search
None
See application file for complete search history.

(56) References Cited

U.S. PATENT DOCUMENTS

| | | | | |
|---|---|---|---|---|
| 5,768,458 A * | 6/1998 | Ro | .............. | G02B 6/2937 385/79 |
| 6,400,862 B1 * | 6/2002 | Liu | .............. | G02B 6/2937 385/24 |
| 6,515,776 B1 * | 2/2003 | Naganuma | ........ | G02B 6/29367 398/82 |
| 6,633,701 B2 | 10/2003 | Li et al. | | |
| 6,729,770 B2 * | 5/2004 | Brun | .............. | G02B 6/2937 385/60 |
| 6,888,980 B2 | 5/2005 | Yu et al. | | |
| 7,187,826 B2 | 3/2007 | Brun et al. | | |
| 7,212,343 B1 * | 5/2007 | He | .............. | G02B 6/29365 359/618 |
| 8,351,791 B1 * | 1/2013 | Wang | .............. | H04J 14/02 398/85 |
| 9,057,841 B2 * | 6/2015 | Ji | .............. | G02B 6/2937 |
| 9,219,549 B2 | 12/2015 | Gui et al. | | |
| 10,120,142 B2 * | 11/2018 | Lee | .............. | G02B 6/4203 |
| 10,162,115 B2 * | 12/2018 | Peng | .............. | G02B 6/2937 |
| 10,281,654 B2 * | 5/2019 | Yue | .............. | G02B 6/2938 |
| 2003/0072527 A1 * | 4/2003 | Li | .............. | G02B 6/2938 385/34 |

(Continued)

*Primary Examiner* — Jai M Lee
(74) *Attorney, Agent, or Firm* — Suganda Jutamulia

(57) ABSTRACT

A DeMux/Mux module comprises a first submodule comprising a first fiber and a second fiber disposed symmetrically about a first optical axis of the first submodule, a first lens and a first WDM filter attached to the first lens, A first incident light is incident on the first WDM filter. Light having a first transmitted wavelength is transmitted through the first WDM filter and is output from the second fiber. Light having wavelengths other than the first transmitted wavelengths is reflected from the first WDM filter, and input to a second submodule through light propagation in free space.

19 Claims, 12 Drawing Sheets

(56) References Cited

U.S. PATENT DOCUMENTS

| | | | | |
|---|---|---|---|---|
| 2003/0081908 A1* | 5/2003 | Gage | ............... | G02B 6/262 |
| | | | | 385/74 |
| 2003/0103725 A1* | 6/2003 | Li | ............... | G02B 6/29383 |
| | | | | 385/34 |
| 2004/0067014 A1* | 4/2004 | Hollars | ............ | G02B 6/29365 |
| | | | | 385/33 |
| 2006/0182390 A1* | 8/2006 | Ji | ............... | G02B 6/322 |
| | | | | 385/31 |
| 2013/0302032 A1* | 11/2013 | Shimakawa | ........ | G02B 6/2937 |
| | | | | 398/48 |
| 2017/0075072 A1* | 3/2017 | Yue | ............... | G02B 6/2938 |

* cited by examiner

US 11,131,804 B1

DEMULTIPLEXER/MULTIPLEXER MODULE USING SUBMODULES HAVING WAVELENGTH-DIVISION-MULTIPLEXING FILTER

FIELD OF THE INVENTION

This invention relates to a demultiplexer/multiplexer, and in particular relates to a demultiplexer/multiplexer module using submodules having wavelength-division-multiplexing filter.

BACKGROUND OF THE INVENTION

The communication networks demand ever increasing bandwidths and flexibility to different communication protocols. WDM (wavelength division multiplexing) is one of the key technologies for such optical fiber communication networks. WDM employs multiple wavelengths in a single fiber to transmit in parallel different communication protocols and bit rates. Transmitting several channels in a single fiber at different wavelengths can multi-fold expand the transmission capacity of the existing optical transmission systems.

A device that multiplexes different wavelength channels into one fiber is a multiplexer, and a device that divides the multiplexed channels into individual channels is a demultiplexer. Specifically, a multiplexer combines several channels of optical signals into a single signal. In reverse, a demultiplexer separates a single multichannel signal into several individual channel signals. A device that may perform both demultiplexing and multiplexing is referred to a demultiplexer/multiplexer or DeMux/Mux.

A DeMux/Mux may employ a WDM filter, which is usually an interference filter, to separate a light beam of multiple wavelengths into multiple beams of light having individual wavelengths, and to combine multiple beams of light having different wavelengths into a single light beam of multiple wavelengths. However, the misalignment of the WDM filter may cause decreasing of light transmission, and broadening of the channel bandwidth. Accordingly compact DeMux/Mux systems, of which the WDM filter can be aligned with ease, are in demand.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
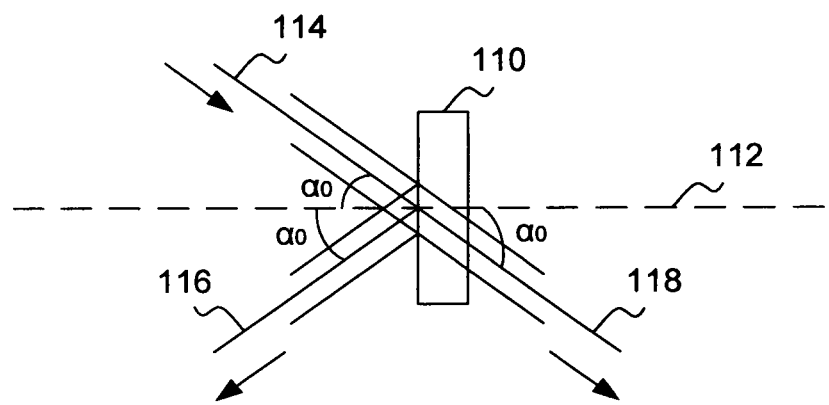
FIG. 1 shows an exemplary WDM filter.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

FIG. 1 shows an exemplary WDM filter 110. Here, WDM filter 110 includes DWDM (dense wavelength division multiplexing) filter and CWDW (coarse wavelength division multiplexing) filter. For example, WDM filter 110 comprises multi-layers of thin films forming an interference filter. An incident collimated light beam 114 comprising wavelengths $\lambda 1, \lambda 2, \lambda 3, \ldots \lambda n$ ($\lambda 1 \neq \lambda 2 \neq \lambda 3 \neq \ldots \neq \lambda n$) is incident on WDM filter 110 at an incident angle $\alpha o$. n is an integer larger than one. Incident angle $\alpha o$ is the angle between collimated beam 114 and an optical axis 112. Optical axis 112 is a normal of WDM filter 110. For example, a part of incident light beam 114 having wavelength $\lambda 1$ is transmitted through WDM filter 110 without changing its direction forming a transmitted light beam 118. Transmitted beam 118 forms the same angle $\alpha o$ with optical axis 112. Another part of incident light beam 114 having wavelength $\lambda 2, \lambda 3, \ldots \lambda n$ is reflected from WDM filter 110 forming a reflected light beam 116. Reflected beam 116 forms the same angle αo with optical axis 112.

Figure 2:
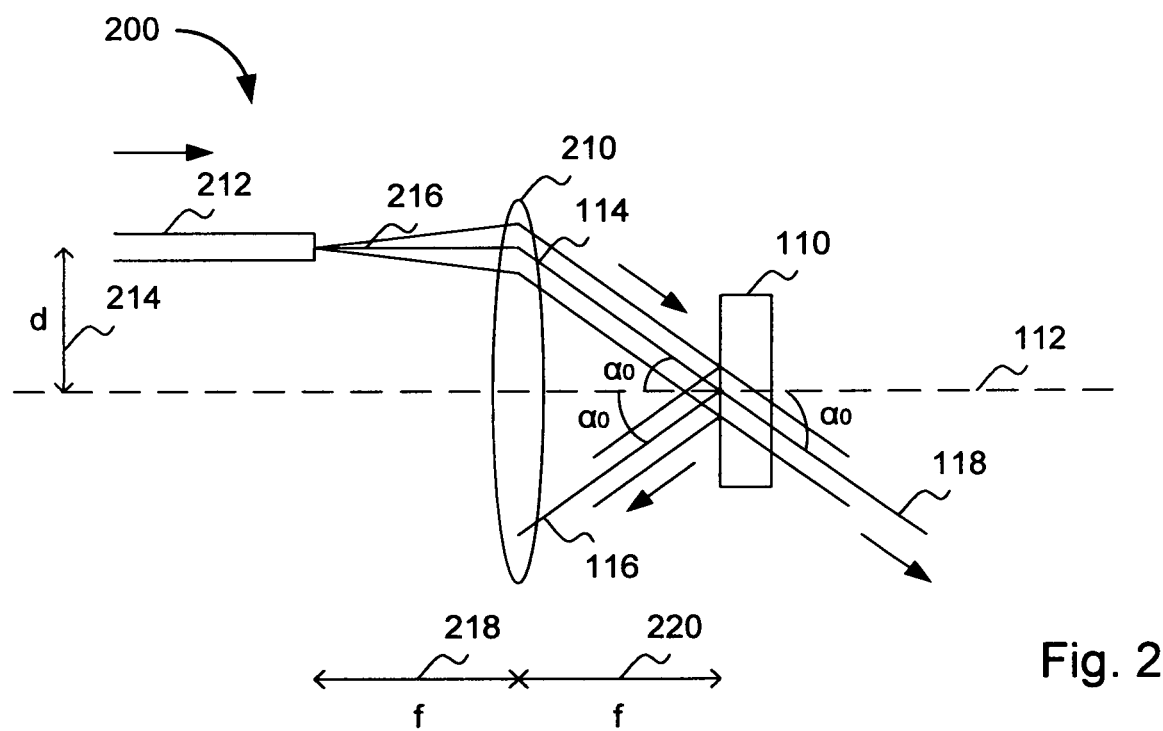
FIG. 2 shows an exemplary embodiment for controlling incident angle $\alpha o$, according to an embodiment of the present invention.

FIG. 2 shows an exemplary embodiment 200 for controlling incident angle αo, according to an embodiment of the present invention. A lens 210 has an optical axis coinciding with optical axis 112. A first fiber 212 is positioned at a distance d 214 from optical axis 112. An end of first fiber 212 is positioned at a focal length f 218 from lens 210. An incident light beam 216 is emitted from the end of first fiber 212. Incident light beam 216 is collimated by lens 210 becoming collimated incident beam 114. WDM filter 110 is positioned at a distance f 220 from lens 210. Incident angle αo formed by incident beam 114 and optical axis 112 is controlled by distance d 214, which is expressed:

$$\tan \alpha o = d/f,$$

where d is distance of first fiber 214 from optical axis 112, and f is a focal length 220 of lens 210. Light beam 216 comprises wavelengths λ1, λ2, λ3, ... λn similar to incident beam 114 of FIG. 1. The rest of FIG. 2 is similar to FIG. 1, thus further description is omitted.

Figure 3:
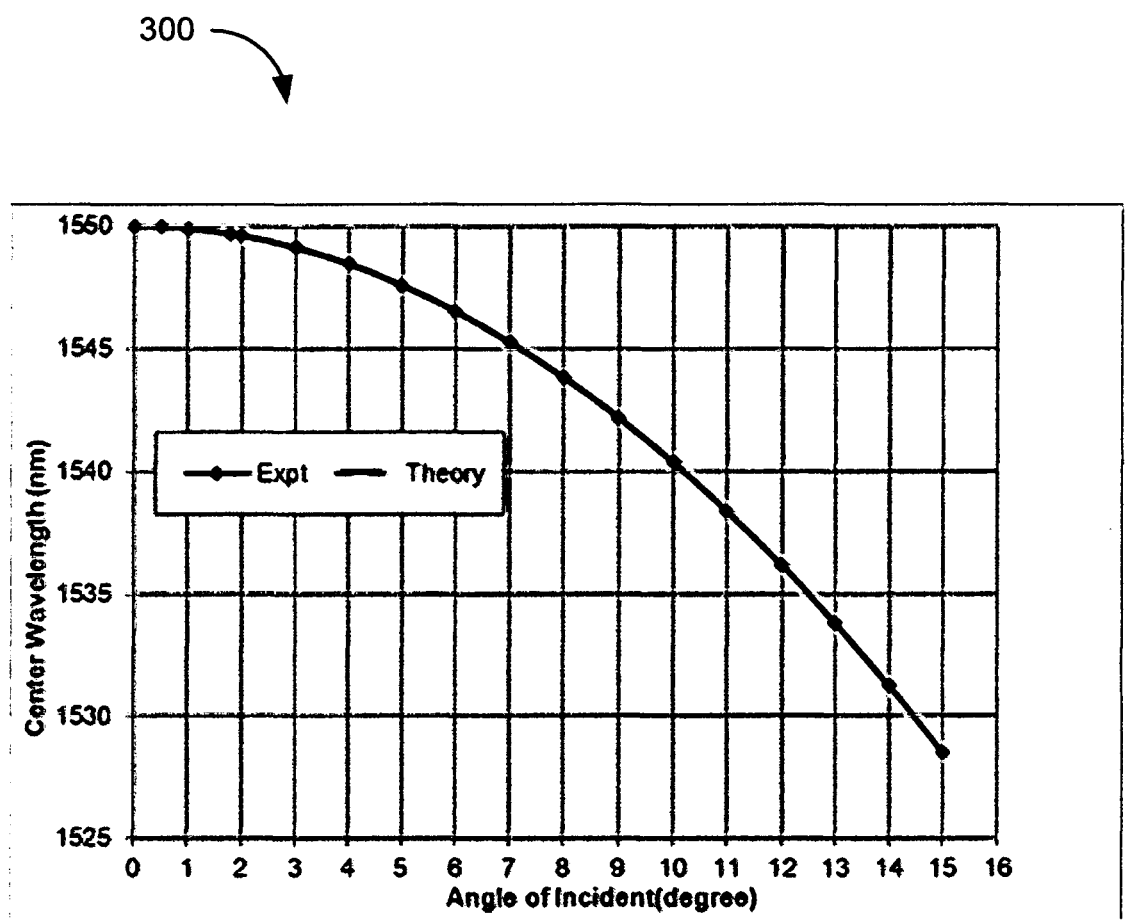
FIG. 3 shows an exemplary plot showing center wavelength as function of incident angle.

FIG. 3 shows an exemplary plot 300 showing center wavelength as function of incident angle. In this example, the WDM filter is designed and made for transmitting light at wavelength 1550 nm with incident angle αo=0. When an incident light beam comprising multiple wavelengths incident on the WDM filter, if the WDM filter is correctly aligned at αo=0, the transmitted beam will have a center wavelength 1550 nm. If αo is not zero, which is the designed value, the center wavelength of the transmitted light will not be 1550 nm. The center wavelength shifts as the incident angle increases, away from its designed value.

Figure 4:
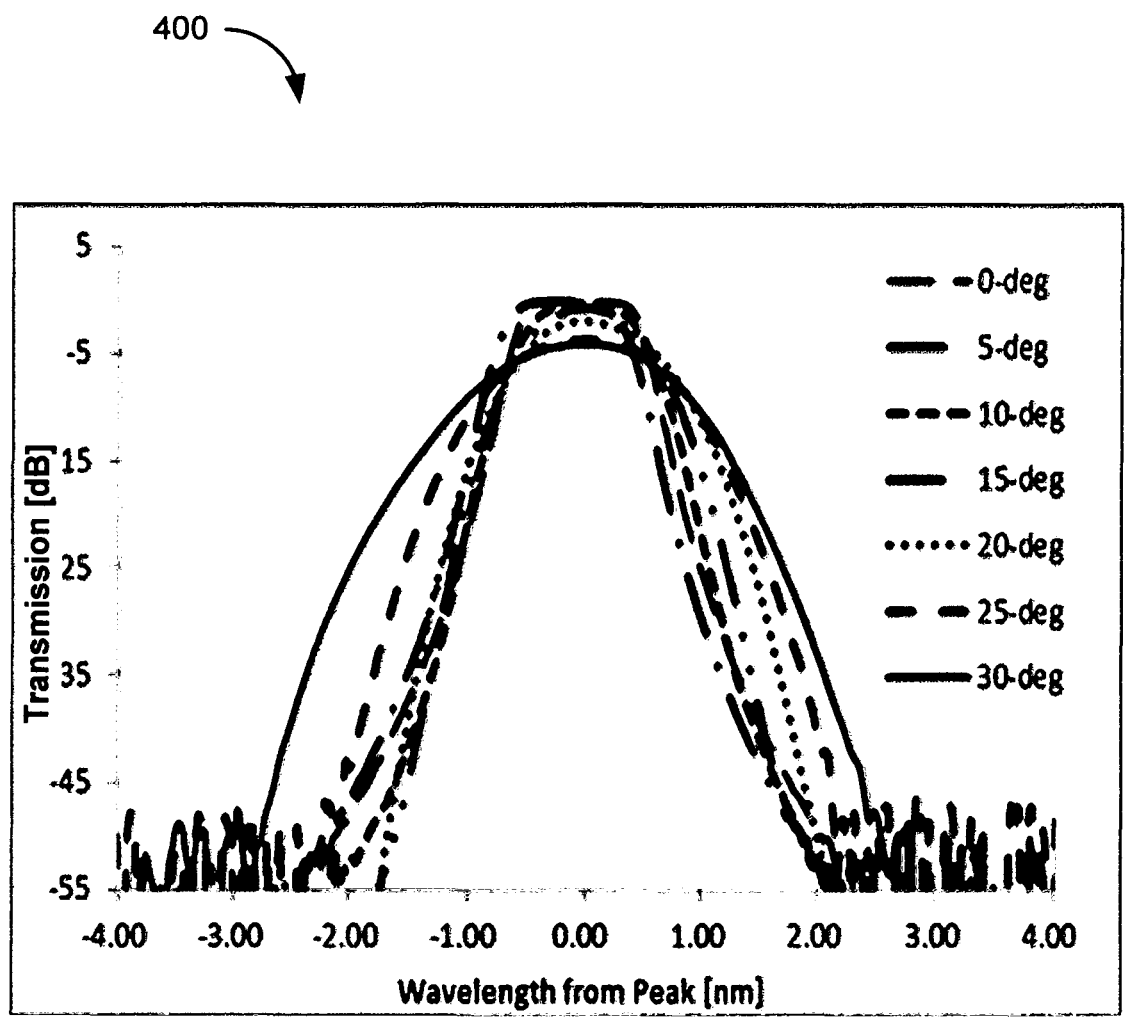
FIG. 4 shows an exemplary plot showing passband as function of incident angle.

FIG. 4 shows an exemplary plot 400 showing passband as function of incident angle. In this example, the incident angle is designed at zero. The ordinate of plot 400 indicates transmission, the abscissa indicates the wavelength difference from the wavelength of the transmission peak. The transmission peak is at zero abscissa. For an incident angle larger than 5 degrees, the passband will increase, the transmission will decrease, and the sidewalls of the passbands will lose steepness, which causes decreasing isolation with neighboring channels of the WDM filter.

FIG. 3 and FIG. 4 shows that the correct alignment of incident angle is critical to keep the good performance of a device or system using WDM filter. The incident angle αo can be determined by distance d 214 and focal length f 218 and 220 as shown in FIG. 2. For example, embodiment 200 would keep a correct incident angle and an acceptable passband.

Figure 5:
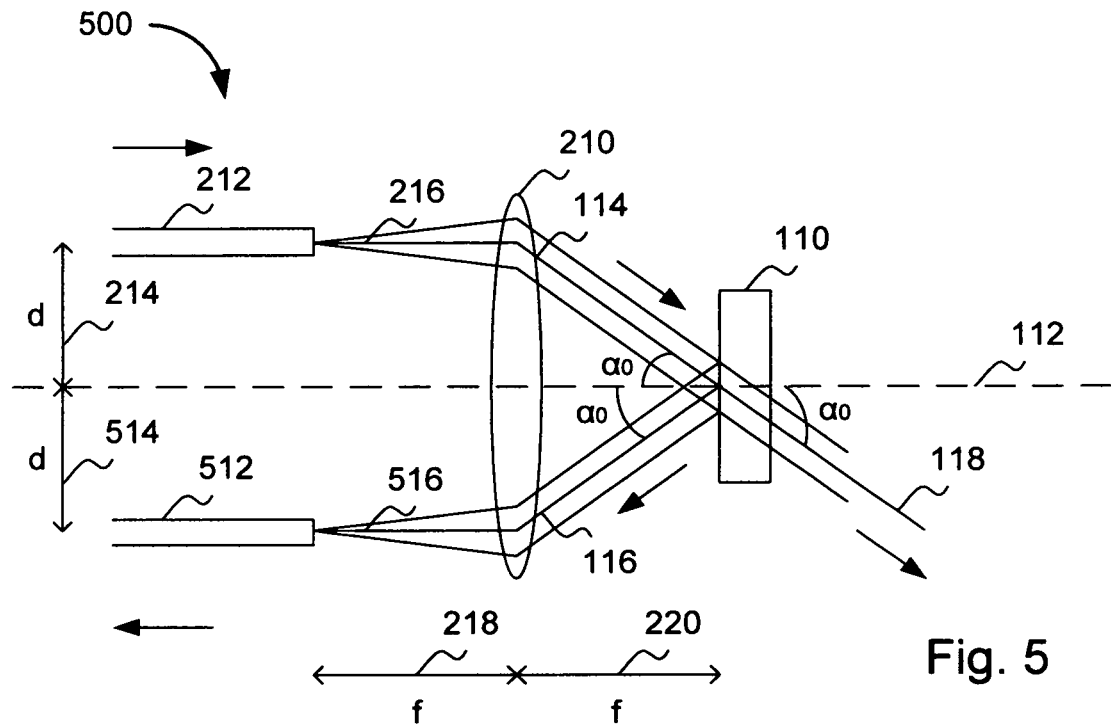
FIG. 5 shows an exemplary embodiment using WDM filter, according to an embodiment of the present invention.

FIG. 5 shows an exemplary embodiment 500 using WDM filter, according to an embodiment of the present invention. Embodiment 500 is similar to embodiment 200 having an additional second fiber 512. Embodiment 500 comprises WDM filter 110, lens 210, first fiber 212 to emit incident light beam 216, and second fiber 512 to receive a reflected light beam 516 from WDM filter 110. Incident light beam 216 comprising wavelengths λ1, λ2, λ3, ... λn is collimated by lens 210 becoming incident light beam 114 incident on WDM filter 110 at incident angle αo. A part of incident light beam 114 having wavelength λ1 is transmitted through WDM filter 110 without changing its direction forming transmitted light beam 118. Transmitted beam 118 forms the same angle αo with optical axis 112. Another part of incident light beam 114 having wavelength λ2, λ3, ... λn is reflected from WDM filter 110 forming reflected light beam 116. Reflected beam 116 forms the same angle αo with optical axis 112. Reflected beam 116 is a collimated beam similar to incident beam 114. Collimated reflected beam 116 is focused by lens 210 becoming reflected light beam 516. Reflected beam 516 is focused at an end of second fiber 512, and enters second fiber 512.

Second fiber 512 is positioned at a distance d 514 from optical axis 112. First fiber 212 and second fiber 512 are symmetric about optical axis 112. The end of first fiber 212 and the end of second fiber 512 are positioned at focal length f 218 from lens 210. WDM filter 110 is positioned at focal length f 220 from lens 210. Incident beam 114 is incident on WDM filter 110 at optical axis 112, thus incident beam 216 and reflected beam 516 are symmetric about optical axis 112. A central ray of incident beam 216 coincides with an optical axis of first fiber 212. A central ray of reflected beam 516 coincides with an optical axis of second fiber 512. In this manner, the maximum light-fiber coupling is achieved.

Figure 6:
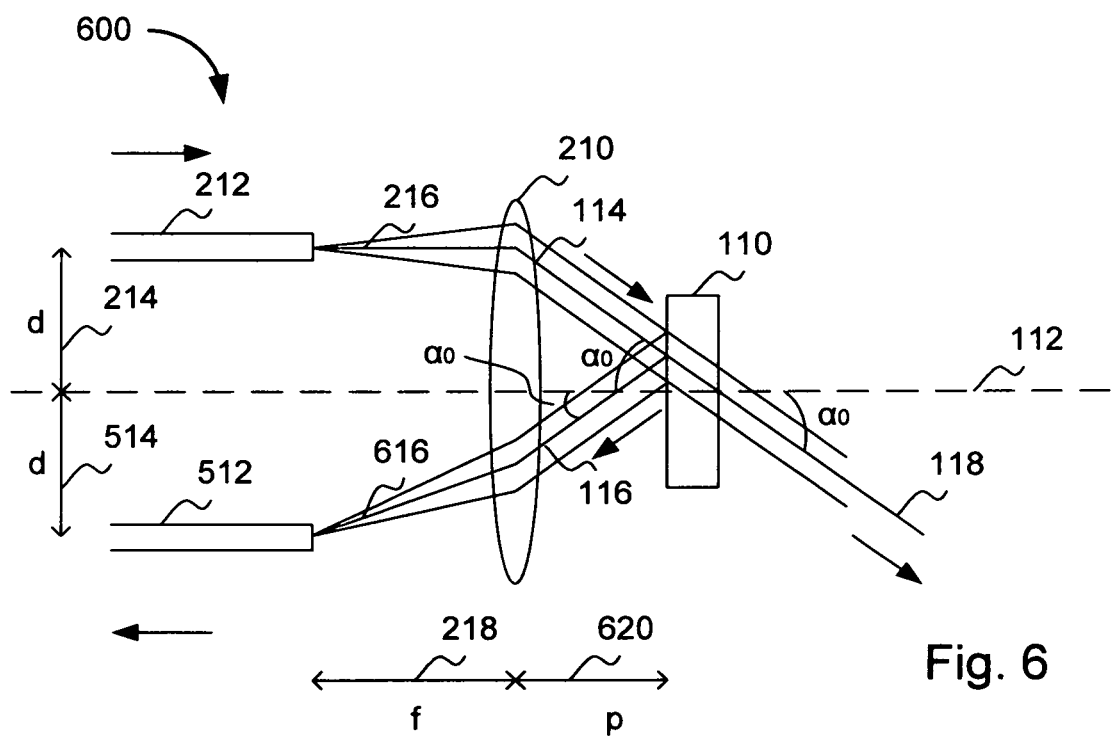
FIG. 6 shows an exemplary embodiment using WDM filter, according to an embodiment of the present invention.

FIG. 6 shows an exemplary embodiment 600 using WDM filter, according to an embodiment of the present invention. Embodiment 600 is similar to embodiment 500, except WDM filter 110 is positioned at a distance p 620 from lens 210, where p 620 in FIG. 6 is smaller than f 220 in FIG. 5. Incident beam 114 is not incident on WDM filter 110 at optical axis 112. Reflected beam 116 forms the same angle αo with optical axis 112, thus collimated reflected beam 116 is focused by lens 210 becoming a reflected beam 616. Reflected beam 616 is similarly focused at the end of second fiber 512, and enters second fiber 512. However, since incident beam 114 is not incident on WDM filter 110 at optical axis 112, a central ray of reflected beam 616 does not coincide with the optical axis of second fiber 512. The central ray of reflected beam 616 is tilted with reference to the optical axis of second fiber 512. Thus, the light-fiber coupling is less than the maximum light-fiber coupling. Accordingly, embodiment 600 is not recommended, embodiment 500 is used.

Figure 7:
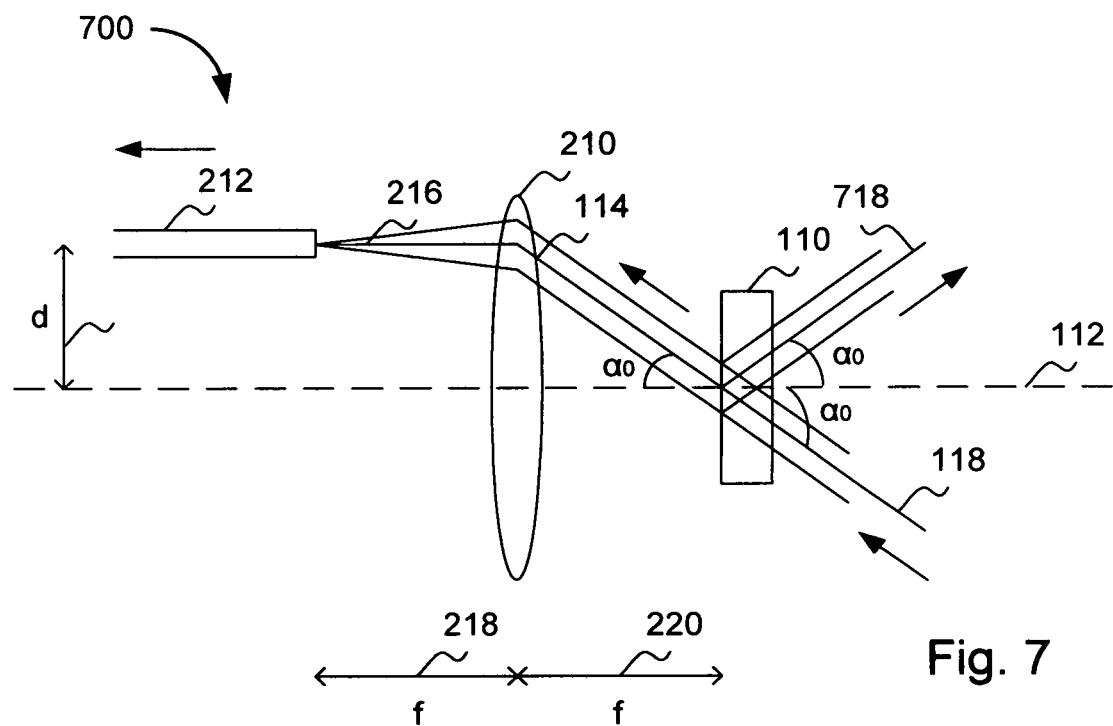
FIG. 7 shows an exemplary embodiment using WDM filter, according to an embodiment of the present invention.

FIG. 7 shows an exemplary embodiment 700 using WDM filter, according to an embodiment of the present invention. Embodiment 700 is similar to embodiment 200, except transmitted beam 118 in FIG. 2 is now an incident light beam 118. Collimated incident light beam 118 comprising wavelengths λ1, λ2, λ3, ... λn is incident on WDM filter 110 at incident angle αo. A part of incident light beam 118 having wavelength λ1 is transmitted through WDM filter 110 without changing its direction forming a transmitted light beam 114. Transmitted beam 114 forms the same angle αo with optical axis 112. Another part of incident light beam 118 having wavelength λ2, λ3, is reflected from WDM filter 110 forming a reflected light beam 718. Reflected beam 718 forms the same angle αo with optical axis 112. Transmitted beam 114 is a collimated beam similar to incident beam 118. Collimated transmitted beam 114 is focused by lens 210 becoming a transmitted beam 216. Transmitted beam 216 is focused at the end of first fiber 212, and enters first fiber 212. The light propagations of beams 118, 114, and 216 in FIG. 2 are reversed in FIG. 7.

Figure 8:
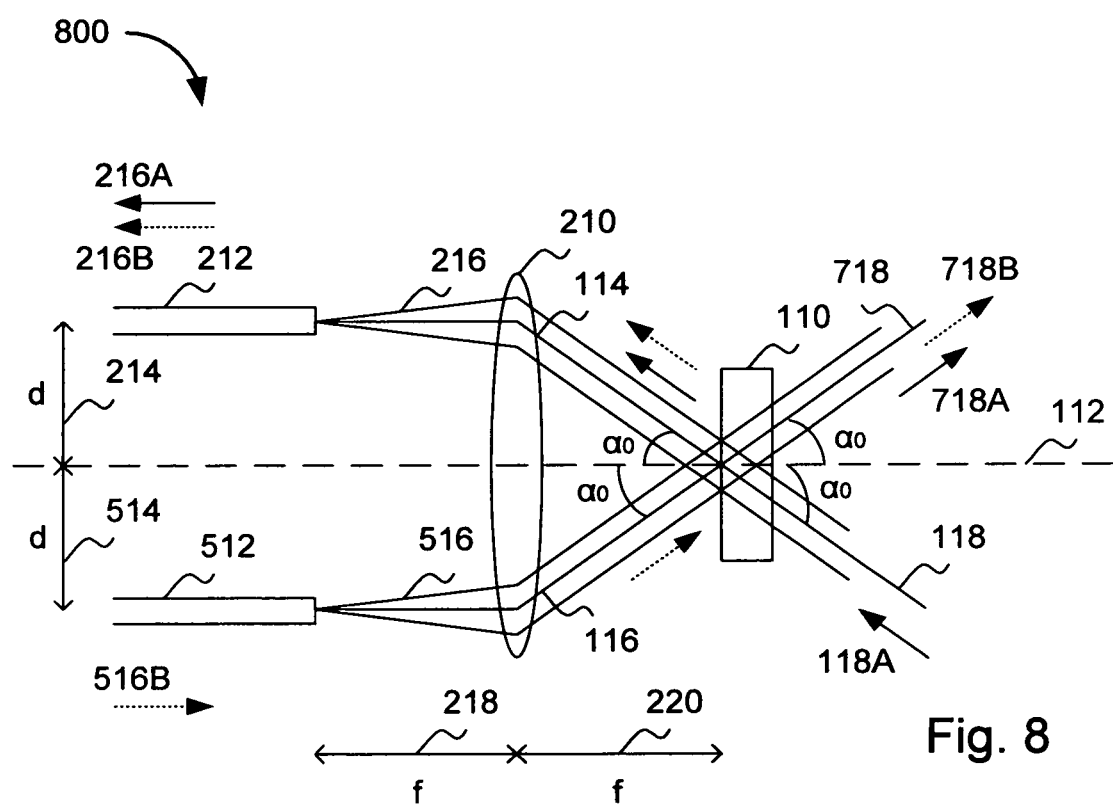
FIG. 8 shows an exemplary embodiment using WDM filter, according to an embodiment of the present invention.

FIG. 8 shows an exemplary embodiment 800 using WDM filter, according to an embodiment of the present invention. Embodiment 800 is similar to embodiment 700 having additional second fiber 512. An incident light beam 516 is emitted from the end of second fiber 512. Incident light beam 516 comprising wavelengths λ1, λ2, λ3, ... λn is collimated by lens 210 becoming an incident light beam 116 incident on WDM filter 110 at incident angle αo. A part of incident light beam 116 having wavelength λ1 is transmitted through WDM filter 110 without changing its direction forming a transmitted light beam 718. Transmitted beam 718 forms the same angle αo with optical axis 112. Another part of incident light beam 116 having wavelength λ2, λ3, . . . λn is reflected from WDM filter 110 forming a reflected light beam 114. Reflected beam 114 forms the same angle αo with optical axis 112. Reflected beam 114 is a collimated beam similar to incident beam 116. Collimated reflected beam 114 is focused by lens 210 becoming a reflected beam 216. Reflected beam 216 is focused at the end of first fiber 212, and enters first fiber 212. The light propagations of beams 516, 116, 114, and 216 in FIG. 5 are reversed in FIG. 8.

When incident light beam 516 including an incident light 516B comprising wavelengths λ1, λ2, λ3, . . . λn inputs to embodiment 800 through second fiber 512, embodiment 800 outputs a transmitted light 718B having wavelength λ1 to free space and a reflected light 216B having wavelength λ2, λ3, . . . λn through first fiber 212. When incident light beam 118 including an incident light 118A comprising wavelengths λ2, λ3, . . . λn inputs to embodiment 800 through free space, embodiment 800 outputs a transmitted light 216A having wavelength λ1 through first fiber 212 and a reflected light 718A having wavelength λ2, λ3, . . . λn to free space.

When second fiber 512 provides incident light 516B comprising wavelengths λ1, λ2, λ3, . . . λn, and incident light 118A comprising wavelengths λ1, λ2, λ3, . . . λn is incident on WDM filter 110 from free space, an output beam through first fiber 212 includes transmitted light 216A having wavelength λ1 and reflected light 216B having wavelength λ2, λ3, . . . λn and an output beam to free space includes reflected light 718A having wavelength λ2, λ3, . . . λn and transmitted light 718B having wavelength λ1.

Figure 9:
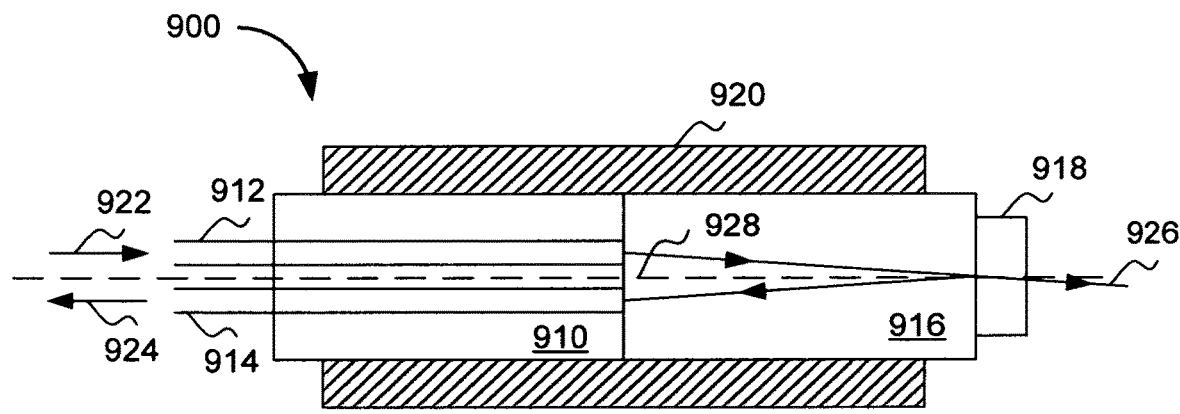
FIG. 9 shows an exemplary submodule, according to an embodiment of the present invention.

FIG. 9 shows an exemplary submodule 900, according to an embodiment of the present invention. Submodule 900 is equivalent to embodiment 500 of FIG. 5. Submodule 900 comprises a dual fiber ferrule 910 holding a first fiber 912 and a second fiber 914 disposed symmetrically about an optical axis 928 of submodule 900, a package 920 holding ferrule 910 and a lens 916 having an optical axis coinciding with optical axis 928, and a WDM filter 918 attached to lens 916. Lens 916 collimates light emitted from an end of first fiber 912 and light emitted from an end of second fiber 914. In reverse, lens 916 focuses a first collimated light at the end of first fiber 912, and a second collimated light at the end of second fiber 914. Submodule 900 is a dual fiber collimator having an additional WDM filter.

Lens 916 may be a GRIN (graded-index) lens. Other types of lens are also possible, such as a GRDIUM (axial gradient index glass) lens, a C-lens, a plano-convex lens. The distance of first fiber 912 from optical axis 928 is the same as the distance of second fiber 914 to optical axis 928, which is distance d, similar to FIG. 2 and FIG. 5. WDM filter 918 is disposed at a focal plane of lens 916 having focal length f, similar to FIG. 2 and FIG. 5. For example, the focal plane of a GRIN lens may be made at an end of the GRIN lens. WDM filter 918 may be attached to an end of lens 916 using adhesive.

Comparing FIG. 9 to FIG. 8, which is flipped upside down, first fiber 912 is equivalent to second fiber 512, second fiber 914 is equivalent to first fiber 212, lens 916 is equivalent to lens 210, WDM filter 918 is equivalent to WDM filter 110, and optical axis 928 is equivalent to optical axis 112. Consequently, an incident light 922 is equivalent to incident light 516B, a reflected light 924 is equivalent to reflected light 216B, and a transmitted light 926 is equivalent to transmitted light 718B. Incident light 922 comprising wavelengths λ1, λ2, λ3, . . . λn inputs to submodule 900 through first fiber 912, submodule 900 outputs a transmitted light 926 having wavelength λ1 to free space and a reflected light 924 having wavelength λ2, λ3, . . . λn through second fiber 914.

Figure 10:
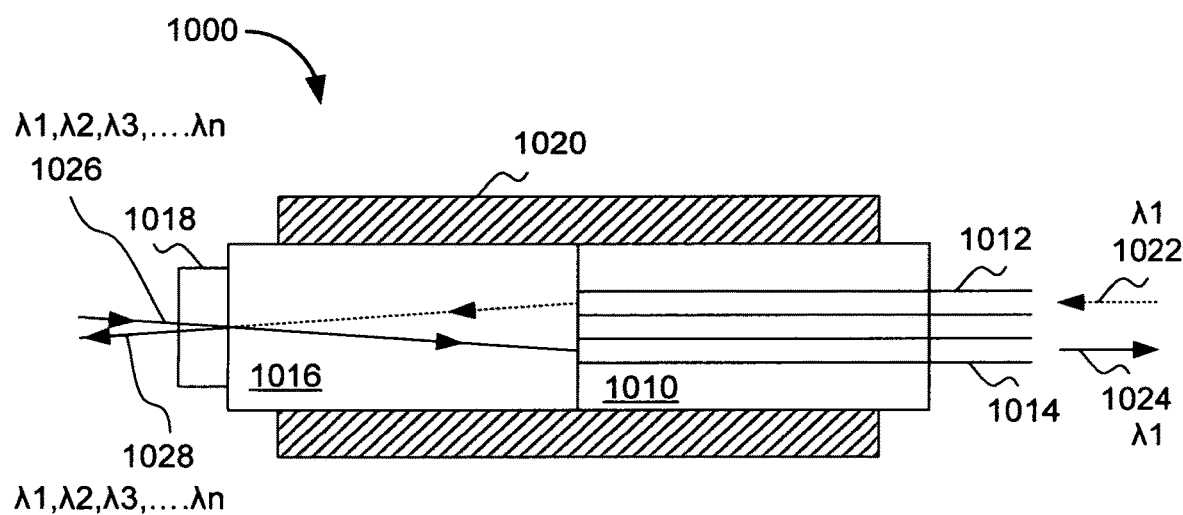
FIG. 10 shows an exemplary submodule, according to an embodiment of the present invention.

FIG. 10 shows an exemplary submodule 1000, according to an embodiment of the present invention. Submodule 1000 is similar to submodule 900, which is flipped left to right. Submodule 1000 comprises a dual fiber ferrule 1010 holding a first fiber 1012 and a second fiber 1014, a package 1020 holding ferrule 1010 and a lens 1016, and a WDM filter 1018 attached to lens 1016.

Comparing FIG. 10 to FIG. 8, which is rotated by 180 degrees, first fiber 1012 is equivalent to second fiber 512, second fiber 1014 is equivalent to first fiber 212, lens 1016 is equivalent to lens 210, and WDM filter 1018 is equivalent to WDM filter 110. Consequently, a first incident light 1026 is equivalent to incident light 118A, a second incident light 1022 is equivalent to incident light 516B. A first output light 1028 is equivalent to light beam 718 including reflected light 718A and transmitted light 718B. A second output light 1024 is equivalent to light beam 216 including transmitted light 216A and reflected light 216B.

First incident light 1026 comprises wavelengths λ1, λ2, λ3, . . . λn. WDM filter 1018 may be designed for transmitting output light 1024 having wavelength λ1. The rest of first incident light 1026, which comprises wavelength λ2, λ3, . . . λn will be reflected as a part of first output light 1028. Second incident light 1022 may consist of wavelength λ1, thus no part of second incident light will be reflected to combine with transmitted light from first incident light 1026. Second incident light 1022 will be fully transmitted to add to the reflected light from first incident light 1026. Thus, first incident light 1026 comprises wavelengths λ1, λ2, λ3, . . . λn, a component of wavelength λ1 will be dropped from second fiber 1014. Second incident light 1022 adds a new component of wavelength λ1, and first output light 1028 will comprise wavelengths λ1, λ2, λ3, . . . λn similar to first incident light 1026. Second fiber 1014 is a drop port of λ1, first fiber 1012 is an add port of λ1. First incident light 1026 of wavelengths λ1, λ2, λ3, . . . λn may be an input within a DeMux/Mux module to submodule 1000, and first output light 1028 of wavelengths λ1, λ2, λ3, . . . λn may be an output from submodule 1000 within the DeMux/Mux module. First incident light 1026 and first output light 1028 propagate in free space to and from WDM filter 1018, respectively.

WDM filter 1018 may be designed for transmitting light having wavelength λ2, and reflecting the rest. Thus, second fiber 1014 is a drop port of λ2, first fiber 1012 is an add port of λ2. First incident light of wavelengths λ1, λ2, λ3, . . . λn is an input to the submodule 1000, and first output light λ1, λ2, λ3, . . . λn is an output from submodule 1000. Similarly, WDM filter 1018 may be designed for transmitting light having wavelength λ3 or λ4 or . . . λn.

Figure 11:
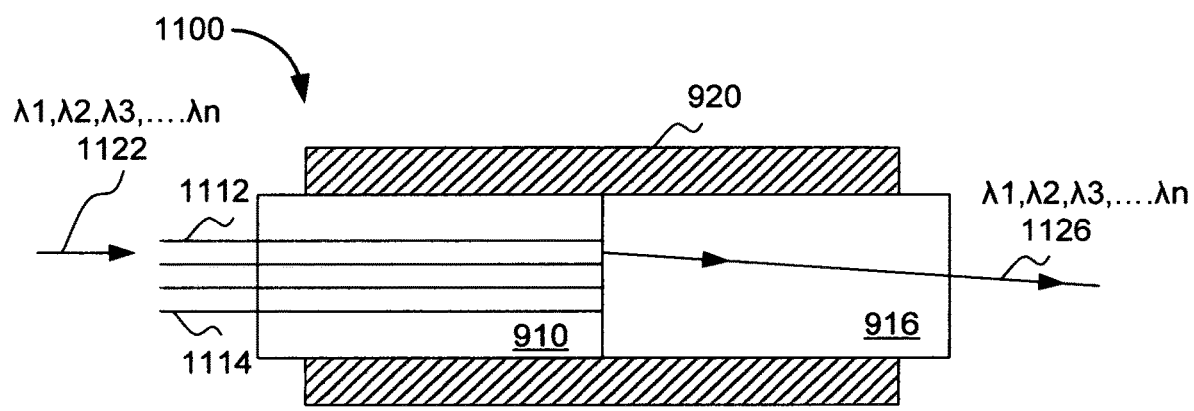
FIG. 11 shows an exemplary submodule, according to an embodiment of the present invention.

FIG. 11 shows an exemplary submodule 1100, according to an embodiment of the present invention. Submodule 1100 is similar to submodule 900 without WDM filter 918. First fiber 912 is renamed as a first fiber 1112, and second fiber 914 is renamed as a second fiber 1114. An incident light 1122 comprises wavelengths λ1, λ2, λ3, . . . λn. Because no WDM filter is included in submodule 1100, an output light 1126 also comprises wavelengths λ1, λ2, λ3, . . . λn, while output light 926 in FIG. 9 has only one wavelength λ1.

Figure 12:
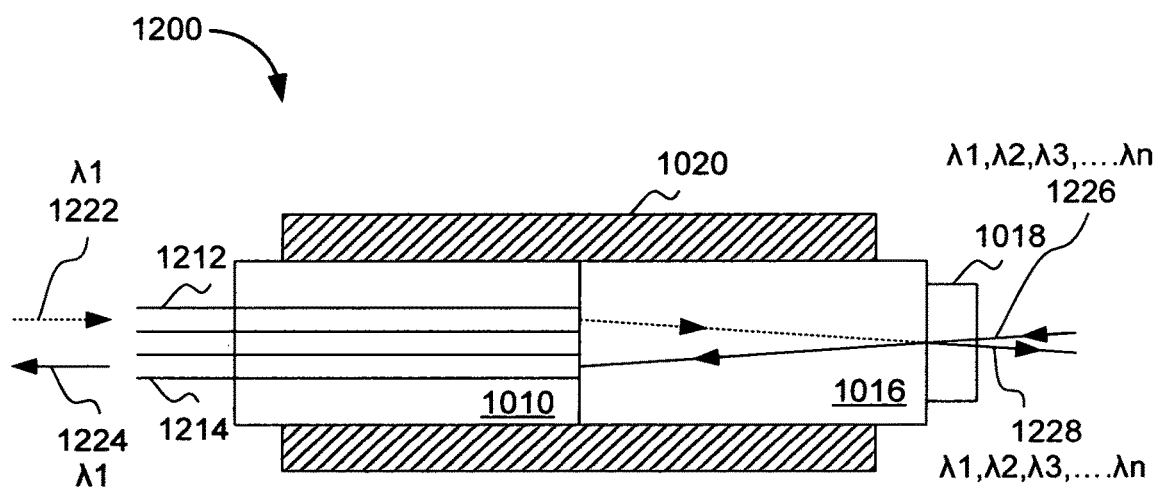
FIG. 12 shows an exemplary submodule, according to an embodiment of the present invention.

FIG. 12 shows an exemplary submodule 1200, according to an embodiment of the present invention. Submodule 1200 is similar to submodule 1000 flipped left to right. First fiber 1012 is renamed as a first fiber 1212, and second fiber 1014 is renamed as a second fiber 1214. A first incident light 1226 is equivalent to first incident light 1026, a second incident light 1222 is equivalent to second incident light 1022. A first output light 1228 is equivalent to first output light 1028. A second output light 1224 is equivalent to second output light 1024.

Thus, first incident light 1226 comprises wavelengths λ1, λ2, λ3, . . . λn, a component of wavelength λ1 will be dropped from second fiber 1224. Second incident light 1222 adds a new component of wavelength AA, and first output light 1228 will comprise wavelengths λ1, λ2, λ3, . . . λn similar to first incident light 1226. Second fiber 1214 is a drop port of λ1, first fiber 1212 is an add port of λ1. First incident light 1226 of wavelengths λ1, λ2, λ3, . . . λn may be an input within a DeMux/Mux module to submodule 1200, and first output light 1228 of wavelengths λ1, λ2, λ3, . . . λn may be an output from submodule 1200 within the DeMux/Mux module. First incident light 1226 and first output light 1228 propagate in free space to and from WDM filter 1018, respectively.

Figure 13:
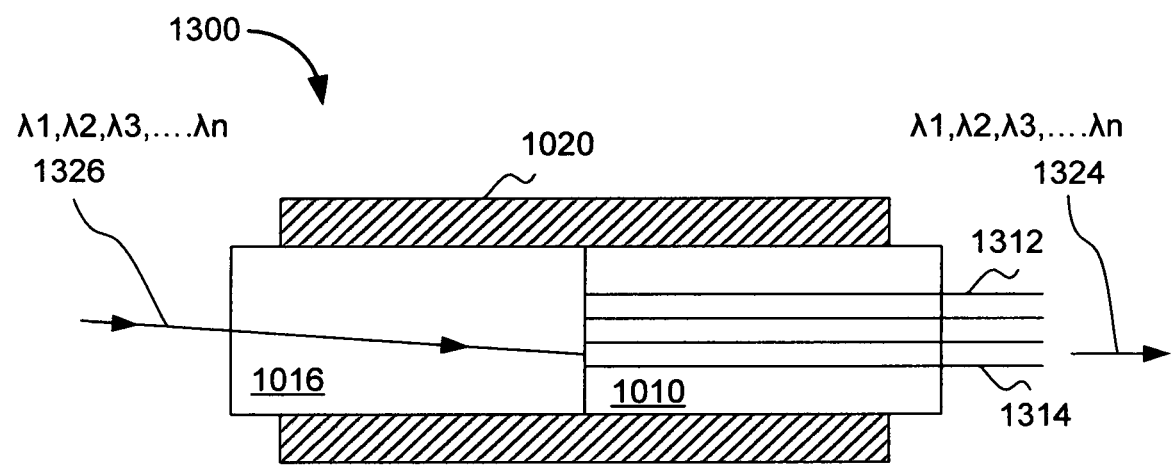
FIG. 13 shows an exemplary submodule, according to an embodiment of the present invention.

Similar to submodule 1000, WDM filter 1018 may be designed for transmitting light having wavelength λ2, and reflecting the rest. Thus, second fiber 1214 is a drop port of λ2, first fiber 1212 is an add port of λ2. Similarly, WDM filter 1018 may be designed for transmitting light having wavelength λ1, λ2, λ3, . . . λn FIG. 13 shows an exemplary submodule 1300, according to an embodiment of the present invention. Submodule 1300 is similar to submodule 1000 without WDM filter 1018. First fiber 1012 is renamed as a first fiber 1312, and second fiber 1014 is renamed as a second fiber 1314. First fiber 1312 is equivalent to first fiber 1012, second fiber 1314 is equivalent to second fiber 1012. In FIG. 13, a first incident light 1326 is equivalent to first incident light 1026, there is no second incident light 1022 of FIG. 10. There is no first output light 1028 of FIG. 10. There is no incident light through first fiber 1312. A second output light 1324 is equivalent to second output light 1024. First incident light 1326 comprises wavelengths λ1, λ2, λ3, . . . λn. Because no WDM filter is included in submodule 1300, second output light 1324 comprises wavelengths λ1, λ2, λ3, . . . λn, while second output light 1024 in FIG. 10 has only one wavelength λ1.

Figure 14:
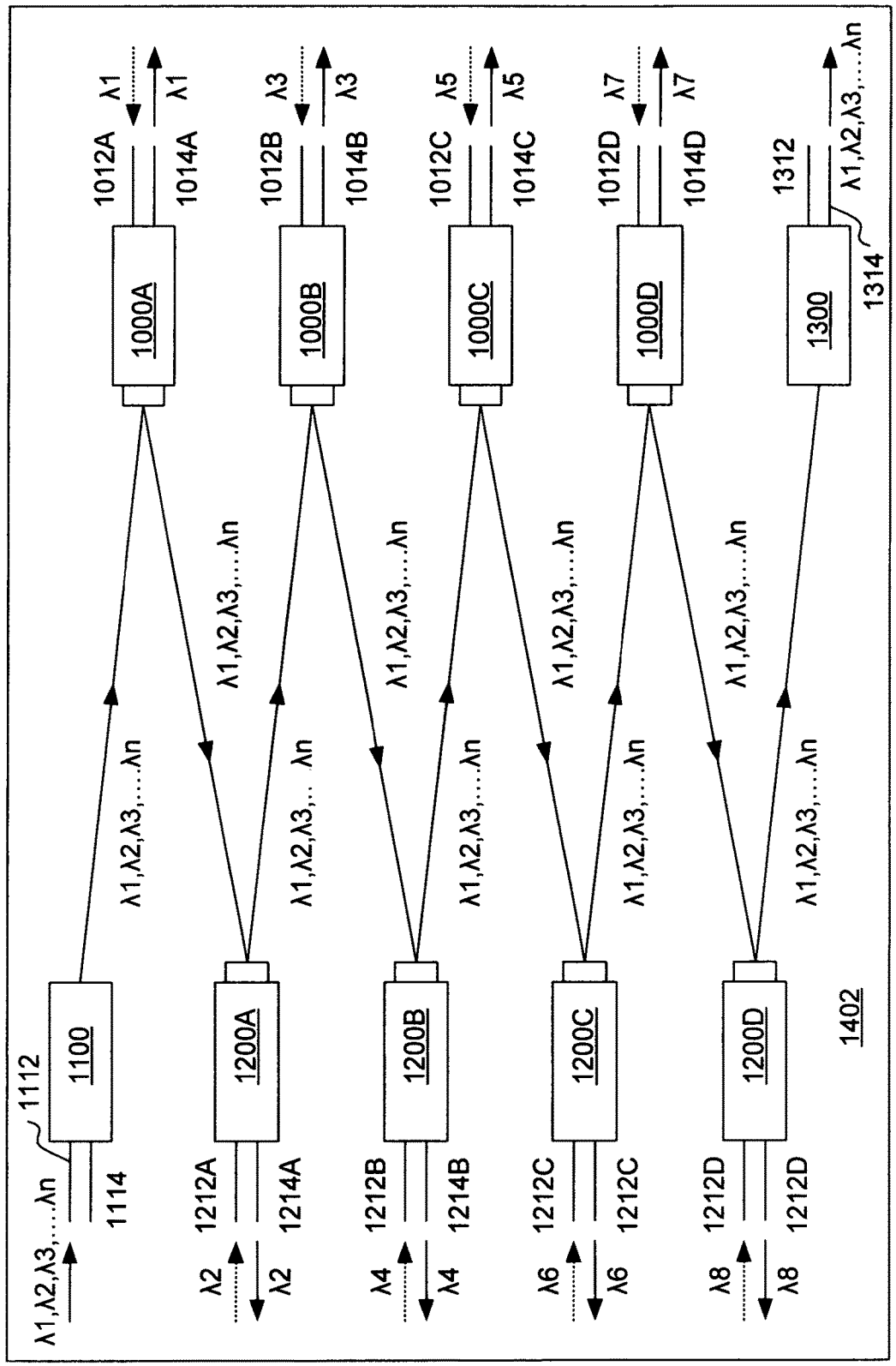
FIG. 14 shows an exemplary DeMux/Mux module using submodules having WDM filter, according to an embodiment of the present invention.

FIG. 14 shows an exemplary DeMux/Mux module 1400 using submodules having WDM filter, according to an embodiment of the present invention. As disclosed previously, the general term WDM includes DWDM and CWDM.

An incident light having wavelengths λ1, λ2, λ3, . . . λn (λ1≠λ2≠λ3 . . . ≠λn) inputs to first fiber 1112 of submodule 1100, which is an input port of module 1400. Submodule 1100 is the same submodule 1100 of FIG. 11. Since submodule 1100 has no WDM filter, submodule 1100 outputs the incident light having wavelengths λ1, λ2, λ3, . . . λn to a submodule 1000A, which is a submodule 1000 having a WDM filter designed at wavelength λ1. Submodule 1000A is the same as submodule 1000 of FIG. 10. Output light from submodule 1100 propagates in free space to submodule 1000A. Submodule 1000A outputs light at wavelength λ1 from its second fiber 1014A, which is a first drop port of module 1400. Submodule 1000A inputs light at wavelength λ1 from its first fiber 1012A, which is a first add port of module 1400. Submodule 1000A outputs light having wavelengths λ1, λ2, λ3, . . . λn to a submodule 1200A, which is a submodule 1200 having a WDM filter designed at wavelength λ2. Submodule 1200A is the same as submodule 1200 of FIG. 12. Output light from submodule 1000A propagates in free space to submodule 1200A.

Submodule 1200A outputs light at wavelength λ2 from its second fiber 1214A, which is a second drop port of module 1400. Submodule 1200A inputs light at wavelength λ2 from its first fiber 1212A, which is a second add port of module 1400. Submodule 1200A outputs light having wavelengths λ1, λ2, λ3, . . . λn to a submodule 1000B, which is a submodule 1000 having a WDM filter designed at wavelength λ3. Submodule 1000B is the same as submodule 1000 of FIG. 10. Output light from submodule 1200A propagates in free space to submodule 1000B.

The process is repeated, for example, until a submodule 1200D outputs light at wavelength λ8 from its second fiber 1214D, which is an eighth drop port of module 1400. Submodule 1200D is the same as submodule 1200 of FIG. 12. Submodule 1200D inputs light at wavelength λ8 from its first fiber 1212D, which is an eighth add port of module 1400. Submodule 1200D outputs light having wavelengths λ1, λ2, λ3, . . . λn to a submodule 1300. Submodule 1300 is the same submodule 1300 of FIG. 13. Since submodule 1300 has no WDM filter, submodule 1300 outputs light having wavelengths λ1, λ2, λ3, . . . λn leaving module 1400 through its second fiber 1314, which is an express port of module 1400. Output light from submodule 1200D propagates in free space to submodule 1300.

WDM filters are designed at the same incident angle αo, thus optical axes of all submodules are aligned parallel. In practice, for example, the angle formed by two optical axes may be within −5 degree and 5 degree. Light path reflected among submodules may be a zigzag path. DeMux/Mux module 1400 is constructed on a substrate 1402. For example, substrate 1402 has a dimension of 50 mm×20 mm. Other dimensions are possible.

Referring to FIG. 2 and FIG. 9, the incident angle αo is determined by distance d, where d is the distance of the fiber from the optical axis of a submodule. In the process of fabricating WDM filters, the actually fabricated effective incident angle may not be exactly the same as the designed incident angle αo. Each individual fabricated WDM filter may have slightly different effective incident angle. For a designed incident angle αo, a number of submodules are prefabricated that have slightly different distances d. This is for the purpose of aligning the submodule without tilting the WDM filter. For example, the distance of first fiber 912 or second fiber 914 from optical axis 928 of submodule 900 is d, and d may be: 553, 556, 583, 598, 603, 620, 652, 657, . . . μm. A first submodule 900 has d=553 μm, a second submodule 900 has d=556 μm, a third submodule 900 has d=583 μm, a fourth submodule 900 has d=598 μm, . . . , and so on.

After the first submodule 900, the second submodule 900, the third submodule 900, . . . are prefabricated, a WDM filter is attached to a prefabricated submodule. A submodule that provides the best performance is selected and used in DeMux/Mux module 1400. The best performance includes, highest transmission of light at transmitted wavelength, highest reflection of light at reflected wavelength, and narrowest transmission bandwidth.

After submodules 1100, 1200A, 1200B, 1200C, 1200D, 1000A, 1000B, 1000C, 1000D, and 1300 are prefabricated, they are assembled to construct DeMux/Mux 1400. Submodules 1200A, 1200B, 1200C, 1200D, 1000A, 1000B, 1000C and 1000D are prefabricated having WDM filters in the respective submodules. First, submodule 1000A is aligned with submodule 1100, then submodule 1200A is aligned with submodule 1000A, then submodule 1000B is aligned with submodule 1200A, and so on, until submodule 1300 is aligned with submodule 1200D. In this manner, all submodules are aligned substantially parallel. Light path reflected among submodules forms a zigzag path. Submodules 1100, 1200A, 1200B, 1200C, and 1200D are on one side of module 1400, submodules 1000A, 1000B, 1000C, 1000D, and 1300 are on the other side of module 1400. Light propagates in free space between two submodules.

It is appreciated that DeMux/Mux module 1400 may have k add ports, where k is an integer, and may have m drop ports, where m is integer larger than one. While the incident light input to the input port of module 1400 has wavelengths $\lambda 1, \lambda 2, \lambda 3, \ldots \lambda n$, and the number of drop ports of module 1400 is m, n is larger than or equals m. k may equal m.

Figure 15:
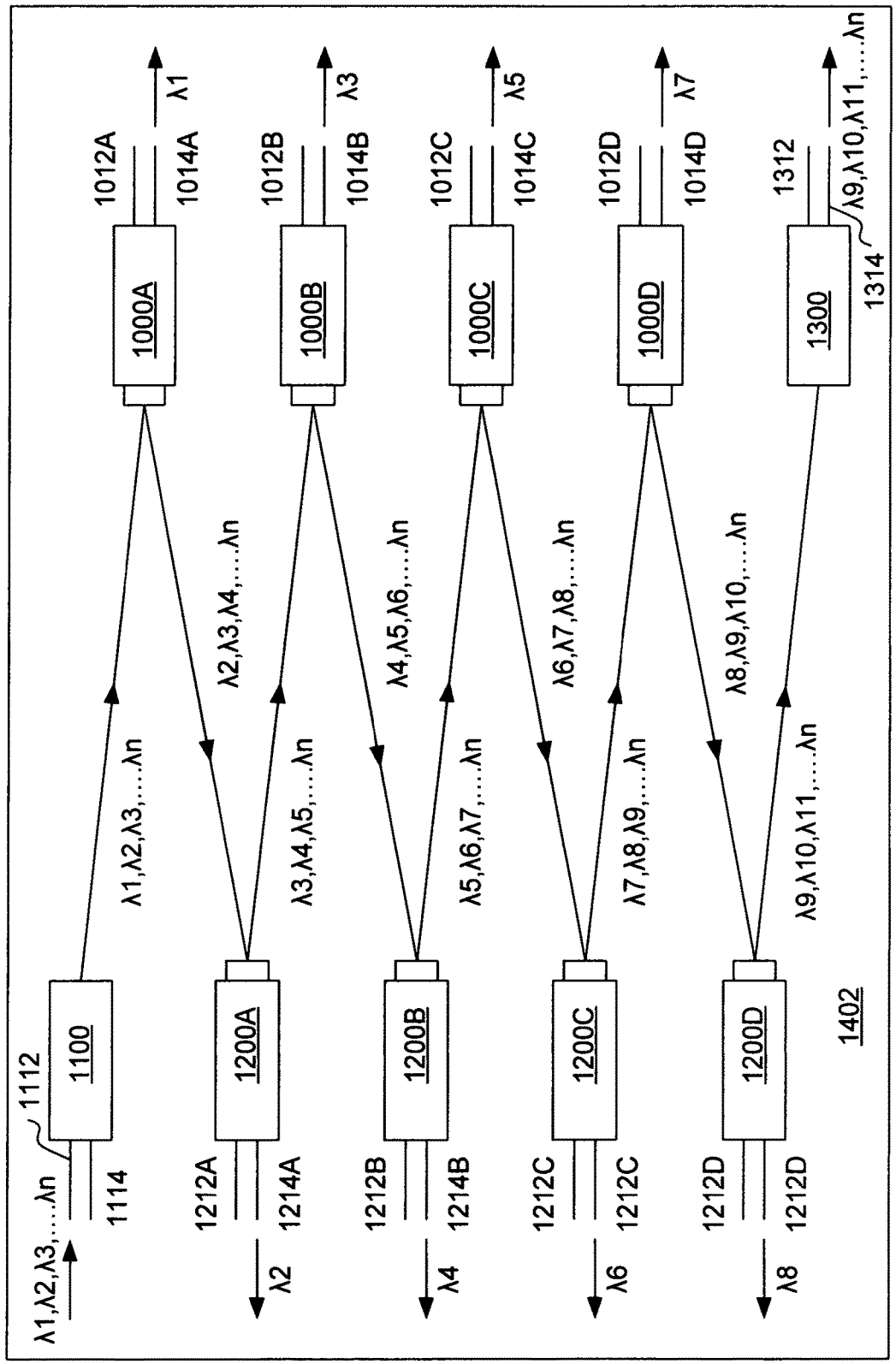
FIG. 15 shows an exemplary DeMux module using submodules having WDM filter, according to an embodiment of the present invention.

FIG. 15 shows an exemplary DeMux (demultiplexer) module 1500 using submodules having WDM filter, according to an embodiment of the present invention. FIG. 15 is similar to FIG. 14, except module 1500 has no add port. Thus DeMux module 1500 is a DeMux/Mux module having no add port.

An incident light having wavelengths $\lambda 1, \lambda 2, \lambda 3, \ldots \lambda n$ inputs to first fiber 1114 of submodule 1100, which is an input port of module 1500. Since submodule 1100 has no WDM filter, submodule 1100 outputs the incident light having wavelengths $\lambda 1, \lambda 2, \lambda 3, \ldots \lambda n$ to submodule 1000A, which is a submodule 1000 having a WDM filter designed at wavelength $\lambda 1$. Submodule 1000A outputs light at wavelength $\lambda 1$ from its second fiber 1014A, which is a first drop port of module 1500. Submodule 1000A outputs light having wavelengths $\lambda 1, \lambda 2, \lambda 3, \ldots \lambda n$ to submodule 1200A, which is a submodule 1200 having a WDM filter designed at wavelength $\lambda 2$.

Submodule 1200A outputs light at wavelength $\lambda 2$ from its second fiber 1214A, which is a second drop port of module 1500. Submodule 1200A outputs light having wavelengths $\lambda 3, \ldots \lambda n$ to submodule 1000B, which is a submodule 1000 having a WDM filter designed at wavelength $\lambda 3$.

The process is repeated, for example, until a submodule 1200D outputs light at wavelength $\lambda 8$ from its second fiber 1214D, which is an eighth drop port of module 1500. Submodule 1200D outputs light having wavelengths $\lambda 9, \ldots \lambda n$ to submodule 1300. Since submodule 1300 has no WDM filter, submodule 1300 outputs light having wavelengths $\lambda 9, \ldots \lambda n$ leaving module 1500 through its second fiber 1314, which is an express port of module 1500. While the incident light input to the input port of module 1500 has wavelengths $\lambda 1, \lambda 2, \lambda 3, \ldots \lambda n$, the number of drop ports of module 1500 is m, n is larger than m.

Figure 16:
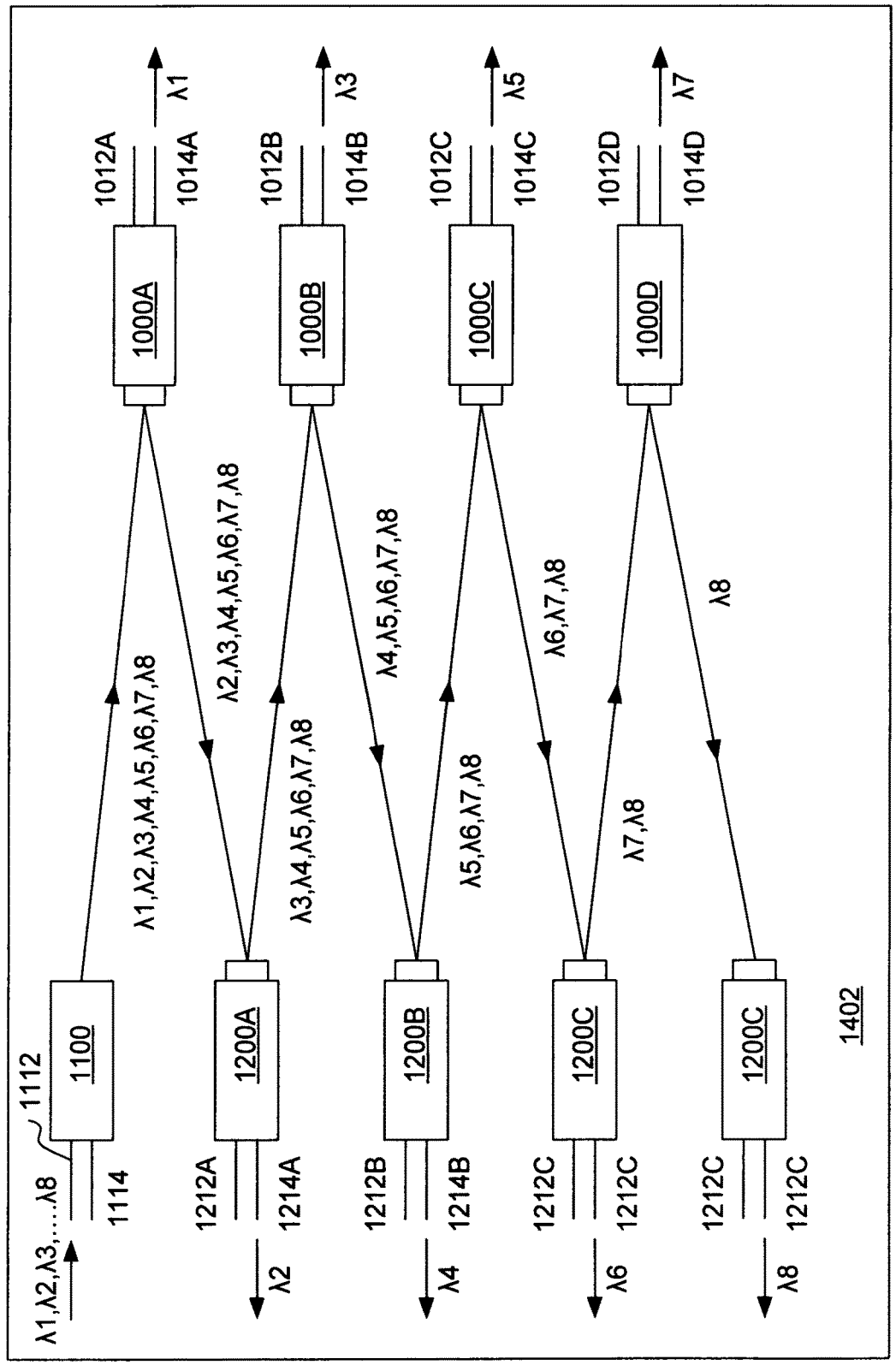
FIG. 16 shows an exemplary DeMux module using submodules having WDM filter, according to an embodiment of the present invention.

FIG. 16 shows an exemplary DeMux (demultiplexer) module 1600 using submodules having WDM filter, according to an embodiment of the present invention. FIG. 16 is similar to FIG. 15, except module 1600 has no submodule 1300. Similar to DeMux module 1500, DeMux module 1600 is a DeMux/Mux module having no add port.

An incident light having wavelengths $\lambda 1, \lambda 2, \lambda 3, \ldots \lambda 8$ inputs to first fiber 1114 of submodule 1100, which is an input port of module 1600. Since submodule 1100 has no WDM filter, submodule 1100 outputs the incident light having wavelengths $\lambda 1, \lambda 2, \lambda 3, \ldots \lambda 8$ to submodule 1000A, which is a submodule 1000 having a WDM filter designed at wavelength Submodule 1000A outputs light at wavelength $\lambda 1$ from its second fiber 1014A, which is a first drop port of module 1600. Submodule 1000A outputs light having wavelengths $\lambda 2, \lambda 3, \ldots \lambda 8$ to submodule 1200A, which is a submodule 1200 having a WDM filter designed at wavelength $\lambda 2$.

Submodule 1200A outputs light at wavelength $\lambda 2$ from its second fiber 1214A, which is a second drop port of module 1600. Submodule 1200A outputs light having wavelengths $\lambda 3, \ldots \lambda 8$ to submodule 1000B, which is a submodule 1000 having a WDM filter designed at wavelength $\lambda 3$.

The process is repeated, for example, until submodule 1200D outputs light at wavelength $\lambda 8$ from its second fiber 1214D, which is an eighth drop port of module 1400. Submodule 1200D has no more light remaining after it drops light at wavelength $\lambda 8$. Thus no module 1300 is needed.

Similar to DeMux/Mux module 1400, DeMux modules 1500 and 1600 may have k add ports, where k is an integer larger than one, and may have m drop ports, where m is integer larger than one.

Figure 17:
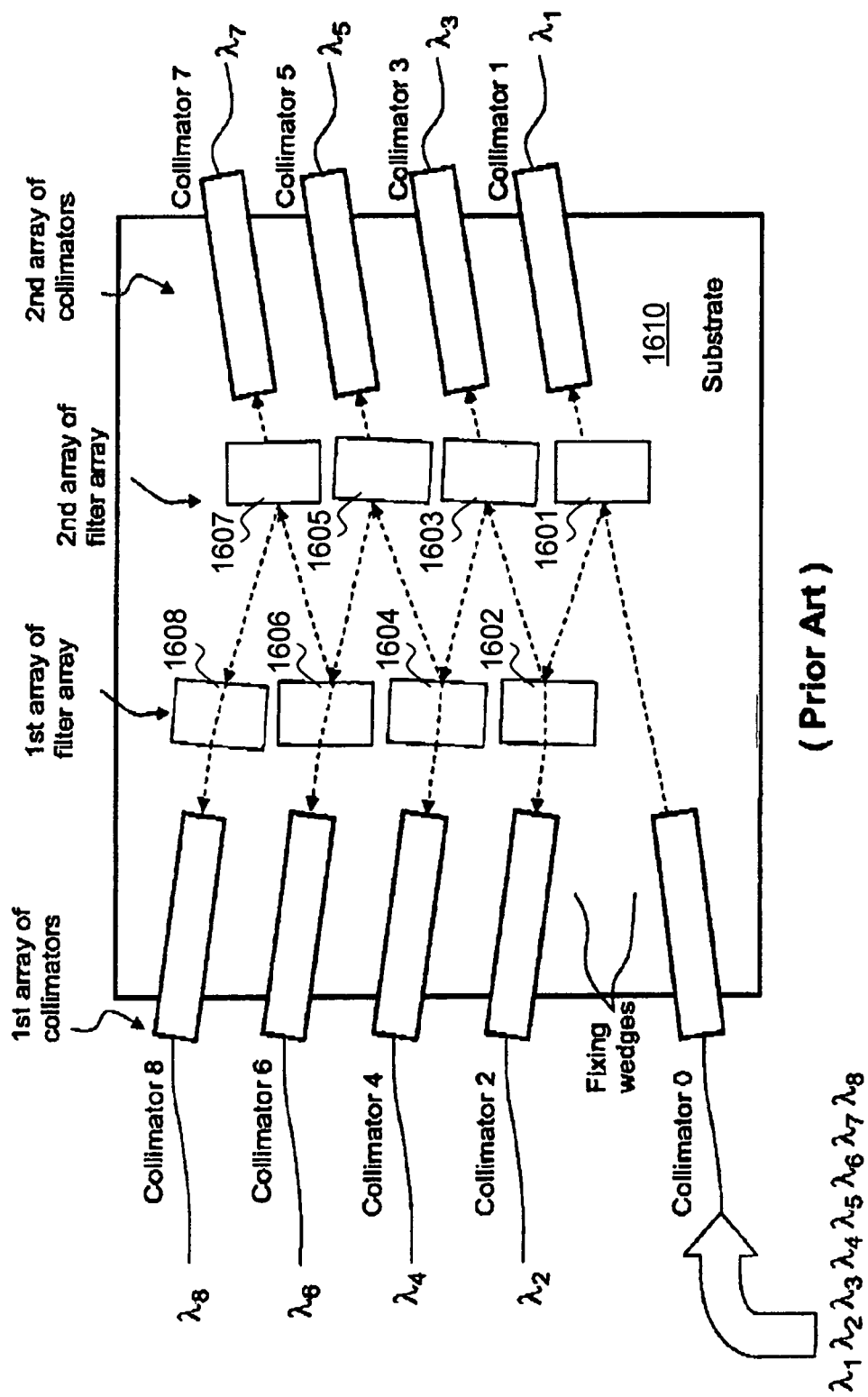
FIG. 17 shows a prior art DeMux module.

FIG. 17 shows a prior art DeMux module comprising a plurality of WDM filters, 1601, 1602, 1603, . . . , 1608, and a plurality of collimators, collimator 0, collimator 1, collimator 2, . . . , collimator 8. In the construction of the DeMux module, first WDM filter 1601 has to be aligned with reference to collimator 0, then collimator 1 has to be aligned and centered with reference to WDM filter 1601. In contrast, in DeMux/Mux modules 1400, and DeMux modules 1500 and 1600, since submodules have been prefabricated having WDM filters attached in the submodules, respectively, the alignment between two submodules involves only one step, which may lower the production cost.

While the present invention has been described herein with respect to the exemplary embodiments and the best mode for practicing the invention, it will be apparent to one of ordinary skill in the art that many modifications, improvements and sub-combinations of the various embodiments, adaptations and variations can be made to the invention without departing from the spirit and scope thereof. For the disclosed methods, the steps need not necessarily be performed sequentially.

The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A DeMux/Mux (demultiplexer/multiplexer) module comprising:
    a first submodule comprising:
        a first fiber and a second fiber disposed symmetrically about a first optical axis of the first submodule;
        a first fiber ferrule holding the first fiber and the second fiber;
        a first lens having an optical axis coinciding with the first optical axis of the first submodule;
        a first package holding the first ferrule and the first lens; and
        a first WDM (wavelength division multiplexer) filter attached to the first lens, wherein light having a first transmitted wavelength is transmitted through the first WDM filter, and light having wavelengths other than the first transmitted wavelengths is reflected from the first WDM filter;
        wherein a first incident light is incident on the first WDM filter, and light having the first transmitted wavelength transmitted through the first WDM filter is output from the second fiber; and
        wherein the first WDM filter is disposed at a first focal length of the first lens;
    a second submodule comprising:
        a third fiber and a fourth fiber disposed symmetrically about a second optical axis of the second submodule;

a second fiber ferrule holding the third fiber and the fourth fiber;

a second lens having an optical axis coinciding with the second optical axis of the second submodule;

a second package holding the second ferrule and the second lens;

a second WDM filter attached to the second lens, wherein light having a second transmitted wavelength is transmitted through the second WDM filter, and light having wavelengths other than the second transmitted wavelengths is reflected from the second WDM filter;

wherein a second incident light is incident on the second WDM filter, the second incident light is light reflected from the first WDM filter of the first submodule, and light having a second transmitted wavelength transmitted through the second WDM filter is output from the fourth fiber; and wherein the second WDM filter is disposed at a second focal length of the second lens;

wherein the second incident light reflected from the first WDM filter of the first submodule propagates in free space and is incident on the second WDM filter of the second submodule.

2. The DeMux/Mux module of claim 1, wherein a third incident light inputs to the first fiber of the first submodule, and wherein the third incident light has a wavelength, which is the same as the first transmitted wavelength.

3. The DeMux/Mux module of claim 1, wherein a third incident light inputs to the third fiber of the second submodule, and wherein the third incident light has a wavelength, which is the same as the second transmitted wavelength.

4. The DeMux/Mux module of claim 2, wherein a fourth incident light inputs to the third fiber of the second submodule, and wherein the fourth incident light has a wavelength, which is the same as the second transmitted wavelength.

5. The DeMux/Mux module of claim 1 further comprising:

a third submodule comprising:
  a fifth fiber and a sixth fiber disposed symmetrically about a third optical axis of the third submodule;
  a third fiber ferrule holding the fifth fiber and the sixth fiber;
  a third lens having an optical axis coinciding with the optical axis of the third submodule; and
  a third package holding the third ferrule and the third lens;
  wherein a third incident light inputs to the fifth fiber, and an collimated light is output from the third lens.

6. The DeMux/Mux module of claim 5 further comprising:

a fourth submodule comprising:
  a seventh fiber and a eighth fiber disposed symmetrically about a fourth optical axis of the fourth submodule;
  a fourth fiber ferrule holding the seventh fiber and the eighth fiber;
  a fourth lens having an optical axis coinciding with the optical axis of the fourth submodule; and
  a fourth package holding the fourth ferrule and the fourth lens;
  wherein a fourth incident light is incident on the fourth lens, and an output light is output from the eighth fiber.

7. The DeMux/Mux module of claim 1 comprising a plurality of submodules, wherein optical axes of the submodules are substantially parallel.

8. The DeMux/Mux module of claim 7 wherein substantially parallel means that angles formed by the optical axes are within −5 degree to 5 degree.

9. The DeMux/Mux module of claim 1 wherein the first lens and the second lens are GRIN lens.

10. The DeMux/Mux module of claim 1 further comprising a substrate, wherein a plurality of submodules are disposed on the substrate to construct the module.

11. The DeMux/Mux module of claim 10 wherein the substrate has a dimension of 50 mm×20 mm.

12. The DeMux/Mux module of claim 1 wherein the DeMux/Mux module has k add ports, and wherein k is an integer larger than one.

13. The DeMux/Mux module of claim 1 wherein the DeMux/Mux module has m drop ports, and wherein m is an integer larger than one.

14. The DeMux/Mux module of claim 1 wherein, an incident angle of the first WDM filter is determined by a distance d of the first fiber from the first optical axis and a focal length f of the first lens.

15. The DeMux/Mux module of claim 14 wherein the incident angle $\alpha o$ is determined as $\tan \alpha o = d/f$.

16. The DeMux/Mux module of claim 1 wherein the first transmitted wavelength differs from the second transmitted wavelength.

17. The DeMux/Mux module of claim 5 wherein the third incident light has n wavelengths and the DeMux/Mux module has m drop ports, and wherein n equals m, and n and m are integers larger than one.

18. The DeMux/Mux module of claim 5 wherein the third incident light has n wavelengths and the DeMux/Mux module has m drop ports, and wherein n is larger than m, and n and m are integers larger than one.

19. The DeMux/Mux module of claim 1 wherein the module has no add port.

* * * * *

UNITED STATES PATENT AND TRADEMARK OFFICE
CERTIFICATE OF CORRECTION

PATENT NO. : 11,131,804 B1  
APPLICATION NO. : 16/873679  
DATED : September 28, 2021  
INVENTOR(S) : Chun He and Yimou Ling Page 1 of 1

It is certified that error appears in the above-identified patent and that said Letters Patent is hereby corrected as shown below:

On the Title Page

Item (71) Applicant: "XDK Communication Equipment (Huizhou) Co. Ltd." should read -XDK Communication Equipment (Huizhou) Ltd.-

Signed and Sealed this  
Twenty-seventh Day of August, 2024

Katherine Kelly Vidal  
*Director of the United States Patent and Trademark Office*